United States Patent [19]
Johnson

[11] Patent Number: 4,965,545
[45] Date of Patent: Oct. 23, 1990

[54] SHAPE MEMORY ALLOY ROTARY ACTUATOR

[75] Inventor: Alfred D. Johnson, Oakland, Calif.

[73] Assignee: TiNi Alloy Company, Oakland, Calif.

[21] Appl. No.: 391,427

[22] Filed: Aug. 9, 1989

[51] Int. Cl.$^5$ .................... H01H 71/18; H01H 61/06
[52] U.S. Cl. ........................................ 337/140; 60/527
[58] Field of Search ................ 337/140, 393; 60/527, 60/528

[56] References Cited

U.S. PATENT DOCUMENTS 4,246,754  1/1981  Wayman .................................. 60/527
4,544,988  10/1985  Hochstein .......................... 337/140

Primary Examiner—H. Broome
Attorney, Agent, or Firm—Flehr, Hohbach, Test, Albritton & Herbert

[57] ABSTRACT

A rotary actuator which provides a differential pulley pair having a shape memory alloy wire. The shape memory alloy wire is thermally cycled through its phase change transition temperature and contracts. Tension forces applied by the ends of the wires to opposite sides of the pulley pair result in a net torque which causes relative rotation between the pulley pair and a reference base. The large mechanical advantage of the differential pulley converts a large force working through a small distance into a relatively large angular rotation.

23 Claims, 2 Drawing Sheets

SHAPE MEMORY ALLOY ROTARY ACTUATOR

This invention relates in general to actuators which produce rotary movement with a large mechanical advantage. More particularly, the invention relates to rotary actuators of the type which operate switches, circuit breakers, control surfaces, light shutters and other devices where rotary movement is used to apply an operating force, interrupt a light beam, open a valve or the like.

BACKGROUND OF THE INVENTION

There are a number of conventional methods of converting linear motion into rotary motion to actuate mechanical devices. Among these methods are rack and pinion gears, rotary solenoids, eccentric axles and crank arms, and pulley systems including differential pulleys.

The prior art differential pulleys have been employed to achieve high mechanical advantage by converting a large force acting through a small distance into a relatively large rotary motion. Differential pulleys of this type have been used in a variety of energy conversion devices. Other uses include windlasses to produce continuous motion or to lift weights. A typically configuration is a differential pulley tackle in which an endless wire or cable passes through a movable lower pulley, which carries a load, and two coaxial, conjointly rotating, upper pulleys having different diameters.

The differential pulley configuration is unique in that mechanical advantage is greatest when the pulley diameters are nearly the same. The wire or cable which unwinds from the large pulley is nearly all taken up on the small pulley so that there is a low rate of change in length of the wire or cable path relative to rotation of the pulley.

OBJECTS AND SUMMARY OF THE INVENTION

It is a general object of the present invention to combine the principal of a differential pulley system with a shape memory alloy element by which linear movement is converted into a relatively larger rotary movement for use in an actuator.

Another object is to provide a rotary actuator in which the high force produced from the relatively small length change of a shape memory alloy element is employed in a differential pulley arrangement as a rotary actuator.

Another object is to provide a rotary actuator of the type described which employs a minimum number of simple parts to convert a small linear motion into a relatively larger rotary motion.

Another object is to produce a rotary actuator of the type described which achieves rapid actuation through a relatively few number of simple parts and in which the actuator is of more robust construction in comparison to conventional rotary actuators.

The invention in summary provides a rotary actuator device comprised of differential moment arms such as a pulley pair. The diameters of the pulleys differ by a small percentage. An elongate shape memory alloy element is attached at one end to the larger pulley and at its other end to the opposite side of the smaller pulley. Idler means holds the shape memory alloy element in tension and conducts it along a path between the two pulleys. The device is actuated by heating the element through its phase change transition temperature. The element then contracts to its memory shape and applies equal forces to opposite sides of the pulley pair. The net torque which is produced causes relative rotation between the pulley pair and a reference base. As rotation takes place a portion of the shape memory alloy material is unwound from the larger pulley along the path and another portion is taken up on the smaller pulley so that the element remains taut about the idler means. By this configuration a small contraction in the element produces a relatively large angular displacement of the differential pulley pair to actuate a switch or other device.

The foregoing and additional objects and features of the invention will become apparent from the following description in which the preferred embodiments have been set forth in detail in conjunction with the accompanying drawings.

DESCRIPTION OF THE PREFERRED EMBODIMENTS

Figure 1:
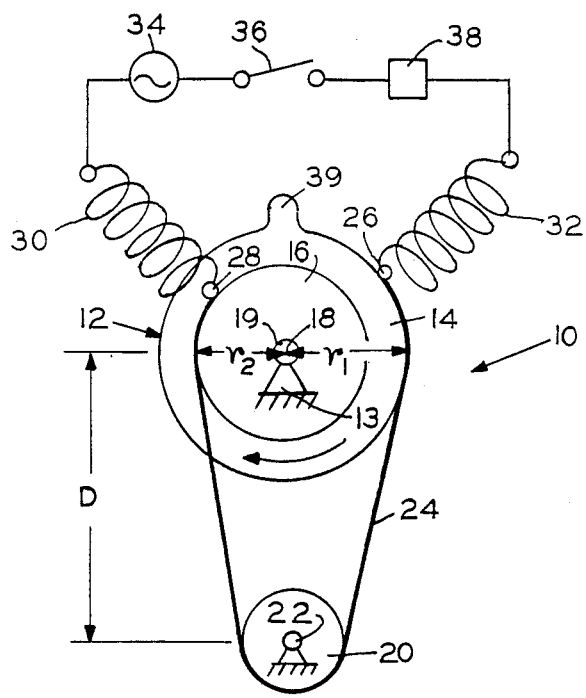
FIG. 1 is a schematic diagram illustrating a rotary actuator incorporating one embodiment of the invention.

Referring to the drawings FIG. 1 illustrates generally at 10 a rotary actuator of the invention comprised of a differential pulley pair 12 which rotates relative to reference base 13 to provide the desired actuating force. The pulley pair is comprised of a large pulley 14 and small pulley 16 which are mounted together for conjoint rotation about a concentric axis 18 on the base, which could be the frame or housing of the actuator. The large and small pulleys can be integral, or they could be separate pulleys keyed onto the common shaft 19. The shaft in turn is mounted for rotation by means of suitable bearings, not shown, on the base. The radius $r_1$ of the large pulley preferably is on the order of 3% larger than the radius $r_2$ of the small pulley. The pulley radii differentials shown in the drawing are exaggerated for purposes of clarity. While full circle pulleys are shown for this embodiment, either or both of the large and small pulleys could be sectors of a circle.

An elongate element 24 of a shape memory alloy (also called SMA) material is provided in the form of a wire having a length L. One end of the wire is fixedly attached at point 26 to the outer diameter of the large pulley and the other end is also fixedly attached to point 28 on the opposite side of the small pulley.

Means for conducting the SMA material or wire between opposite sides of the differential pulley pair is provided and includes an idler pulley 20. The idler pulley is mounted on the reference base for rotation about an axis 22 which is parallel with and spaced at the distance D from the axis of rotation of the pulley pair. The wire conducting means could also comprise a hollow curved tube fixed to the base and performing the same function of a pulley by holding tension on the wire while conducting wire movement along the path of the loop.

The intermediate portion of SMA wire 24 is trained along a path looping over the idler pulley, which holds the wire in tension. Preferably the large and small pulleys 14 and 16 as well as idler pulley 20 are formed with circumferential grooves, not shown, into which wire 24 is reeved. A low force spiral spring, not shown, could be mounted between the pulley pair and base 13 to establish a constant weak torque in a clockwise direction on the pulley pair. This torque would maintain residual tension in the wire and keep it within the grooves of the pulley.

The shape memory alloy material which forms wire 24 has the property of undergoing plastic deformation from a memory shape to a trained shape when cooled. The SMA material then deforms back to the memory shape when heated through its phase change transition temperature while exerting a greater force than the deforming force. As used herein the term "heated through its phase change transition temperature" means heating the material to a temperature which is either within the band of temperature at which the phase change takes place or to a higher temperature. The phase change temperature range is dependent on the particular alloy's composition, heat treatment and stress.

A shape memory alloy material suitable for use in the invention is Nitinol, a titanium nickel alloy having a 53.5–56.5% nickel content by weight. Other suitable shape memory alloys include TiNiPd alloy, CuAlNi alloy, or other Joule effect materials. One example of an SMA material suitable for use in the invention is 6 mil diameter wire of Biometal, which is the trademark for a TiNi alloy sold by TokiAmerica Corporation of Irvine, Calif.

In the embodiment of FIG. 1 the length of SMA wire 24 is heated through its phase change transition temperature by electrical resistance heating. The wire is connected by flexible leads 30 and 32 to a suitable source of electrical power, such as an AC power source 34. An on-off switch 36 and current regulator 38 are connected in the circuit to control operation of the rotary actuator.

When the SMA wire is heated and undergoes its phase change it contracts in length toward its memory shape. This increases the tension forces in the wire which in turn impart torque on the pulley pair. The torque imparted on the larger pulley is opposed by the torque on the smaller pulley so that the net torque T is in accordance with the following:

$$T = (SMA\ wire\ tension) \times (r_1 - r_2) \quad \text{(equation 1)}$$

where $r_1$ is the radius of the larger pulley, and $r_2$ is the radius of the smaller pulley.

The net torque T causes the pulley pair to rotate downwardly on the side of the larger pulley, which is clockwise as shown in FIG. 1, such that a linear portion of the wire is spooled out by the larger pulley while simultaneously a portion of the wire is reeled in by the smaller pulley. The difference in pulley radii creates a net increase in the amount of wire in the loop in accordance with the following:

Amount of wire unwound from larger $$pulley = r_1 \times \theta \quad \text{(equation 2)}$$

where $\theta$ is the angle of rotation of the pulley pair in radians.

Amount of wire wound onto smaller $$pulley = r_2 \times \theta \quad \text{(equation 3)}$$

Combining equations 2 and 3 gives:

$$\Delta L = \theta\ (r_1 - r_2) \quad \text{(equation 4)}$$

where $\Delta L$ is the additional amount of wire put into the path of the loop.

As more wire is spooled out from the larger pulley, the wire begins to slacken and the tension that was created by the SMA phase transformation begins to decrease. The pulley pair continues spooling out wire until the tension drops to a point where equilibrium is reestablished. The final length of wire is in accordance with the following:

$$L_f = L_o + \Delta L_s - \Delta L_c \quad \text{(equation 5)}$$

where $L_f$ is the final length of wire from point 26 to point 28, $L_o$ is the initial length of wire from point 26 to point 28, $\Delta L_s$ is the net length of wire spooled out by the pulley pair, and $\Delta L_c$ is the contraction of the wire due to phase transformation.

With the loop of wire maintained taut, the length of wire between point 26 and point 28 remains unchanged, that is:

$$L_f = L_o \quad \text{(equation 6)}$$

Substituting equation 6 in equation 5 gives:

$$\Delta L_s = \Delta L_c \quad \text{(equation 7)}$$

Equation 4 then becomes:

$$\Delta L_s = \theta\ (r_1 - r_2)$$

or $$\theta = \frac{\Delta L_s}{(r_1 - r_2)} \quad \text{(equation \#8)}$$

where $\Delta L_s = L_o \times$ (contraction ratio of SMA wire) then the following relationship is obtained:

$$\theta = \frac{L_o \times (contraction\ ratio\ of\ SMA)}{(r_1 - r_2)} \quad \text{(equation \#9)}$$

Equation 9 is applied for designing the actuator for specific applications. It will be seen that as the radii of the pulleys $r_1$ and $r_2$ approach each other, the denominator of equation 9 approaches zero and very large rotation angles are obtained. The tradeoff is that for this large velocity advantage there is a decrease in the available torque (equation 1).

The average radius R of the pulley pair is given by the following:

$$R = \frac{(r_1 - r_2)}{2} \quad \text{(equation \#10)}$$

Where the ratio of pulley radii is made equal to the ratio of wire contraction then:

$$\frac{(r_1 - r_2)}{R} = \frac{\Delta L_c}{L} \quad \text{(equation \#11)}$$

Rearranging equation 11 gives:

$$\frac{L}{R} = \frac{\Delta L_c}{(r_1 - r_2)} \quad \text{(equation \#12)}$$

Combining equations 12, 7 and 8 gives:

$$\theta = \frac{L}{R} \quad \text{(equation \#13)}$$

Equation 13 shows that the angle $\theta$ through which the pulley pair rotates is directly proportional to the length L of wire connecting the two sides, with this entire length heated to recover its memory shape, and inversely proportional to the average radius R of the pulley pair.

A typical value for contraction of SMA wire is 3%. It is preferred that the length of wire L be at least twice the average radius R. Equation 13 thereby shows that a contraction of 3% in the SMA wire will cause a rotation $\theta$ of at least two radians. This large value of angular rotation in relation to linear length change is significantly greater than that which could be achieved in other rotary actuators employing SMA materials, and this is an important feature of the invention.

The pulley ratio $$\frac{r_1 - r_2}{R}$$

may be varied as required for a particular application. Thus, a larger pulley ratio can be provided where it is desired to have the wire become slack during a part of the cycle. A smaller pulley ratio can be provided in combination with provisions for spring-loading between the pulley pair and idler pulley so as to keep the wire taut with varying resistance between the pulley pair and idler pulley.

An arm 39 projects radially outwardly from and turns with the pulley pair to provide the operating force, or interrupt a light beam, or the switch, control surface, valve or other end use device. In the next phase of the cycle the electrical power circuit into the SMA wire 24 is opened, permitting the SMA material to cool below its transition temperature. The wire then elongates back to its trained shape. For the next cycle of operation pulley pair 12 can be rotated counterclockwise back to its initial position by a suitable restoring force, such as a return spring, not shown.

One example for the configuration of rotary actuator 10 is the following. Large diameter pulley 14 has a radius $r_1$ of 1.03 cm and small pulley 16 has a radius $r_1$ of 1.0 cm. Idler pulley 20 has a radius of 1.0 cm and the distance between centers of the pulley pair and idler pulley is D=2.5 cm. SMA wire 24 has a length from point 26 to point 28 of L=10 cm and is comprised of 6 mil diameter Biometal wire. The phase change transition temperature range of the Biometal wire is 50° C. to 70° C. Actuator 10 is operated from a 12-volt source to provide heat input of approximately 10 Watt-sec to heat the wire through its transition temperature range. This specific geometry provides an angular displacement of the pulley pair of $\theta = 2$ radians.

Figure 2:
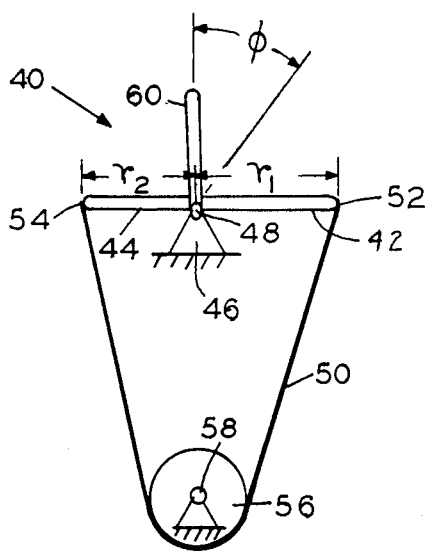
FIG. 2 is a schematic diagram illustrating a rotary actuator incorporating another embodiment of the invention.

The embodiment illustrated in FIG. 2 provides a rotary actuator 40 having first and second moment arms or beams 42 and 44 of unequal length mounted on a base structure 46 for conjoint rotation about a common axis 48. The first moment arm 42 has a radius length $r_1$ and the second moment arm 44 has a radius length $r_2$ which is less than $r_1$ by a predetermined amount. Preferably $r_1$ and $r_2$ differ in length by approximately 3%. An elongate element 50 of shape memory alloy material, preferably an SMA wire, is connected at its one end 52 to the distal end of the first arm and at its opposite end 54 to the distal end of the second arm. The portion of the element intermediate its ends is maintained in tension against the moment arms by an idler pulley 56 which is mounted on the base element for rotation about an axis 58 parallel with and spaced from axis 48.

A suitable electrical power source and control circuit similar to that provided for the embodiment of FIG. 1 is employed to heat SMA wire 50 through its phase change transition temperature, causing the wire to contract to its memory shape. The resulting increased tension in the wire creates a net torque acting clockwise as viewed in FIG. 2 on the moment arms.

The embodiment of FIG. 2 illustrates the general case of the invention in that the moment arms perform the function of the large and small pulleys. One difference is that in the case of FIG. 1 the effective lengths of the moment arms, which are the pulley diameters, remain constant during rotation while in the case of FIG. 2 the effective lengths of the moment arms decrease slightly as a function of the angular displacement of the beams away from right angles to the lines of force. In the embodiment of FIG. 2 an arm 60 is fixedly connected to the center of the moment arms and is angularly displaced through the arc $\phi$ during their rotation to actuate the switch or other device, not shown, which is to be operated.

Figure 3:
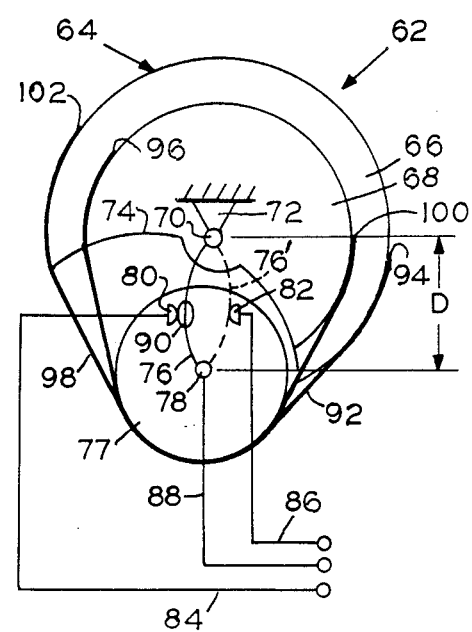
FIG. 3 is a schematic diagram illustrating another embodiment providing a rotary actuator in a circuit breaker.

FIG. 3 illustrates an embodiment providing a bistable rotary actuator 62 for an electric switch application. The actuator 62 comprises a differential pulley pair 64 having a large diameter pulley 66 and small diameter pulley 68 on reference base 72 mounted for conjoint rotation about a common axis 70. A sector of the pulley pair encompassing approximately 115° is formed with a concaval cutout 74.

A crescent-shaped flexible bistable member 76, such as a thin metal strap or spring, is mounted at its upper end to pulley pair 64 at axis 70 so that rotation of the pulley pair also turns the upper end of the bistable member. An idler pulley 77 is rotatably mounted about axis 78 to the lower end of the bistable member at a distance D' from axis 70.

Bistable member 76 is held in an arcuate shape under spring compression by the pair of SMA wires 92 and 98 which are trained around the idler pulley 77. This spring loading of the bistable member maintains wire tension and contact force with the idler pulley. The compressive spring loading also causes the bistable member to rapidly snap to opposite sides when flexed across its overcenter position. The center-to-center distance D' is chosen so that idler pulley 77 is nested within the space provided by concaval cutout 74. This minimizes the length of SMA wire that is required for the actuator. As a result, insertion losses are minimized when the SMA wires are used as pass elements in a circuit, such as for circuit breaker applications.

A switch circuit is provided comprising a pair of switch contacts 80 and 82 mounted at opposite sides of the bistable member, with the contacts connected through respective leads 84 and 86 in the desired end use circuit. A third lead 88 connects the bistable member with the circuit, and a contact 90 carried by this member opens and closes the circuits as it is moved between the two contacts when the bistable member flexes back and forth between its two positions, depending upon the direction of rotation of pulley pair 64.

The SMA wire 98 is provided for operating the switch from its ready position at which bistable member 76 is in the solid line orientation shown in FIG. 3. One end of the wire 98 is connected to the right-hand side of small diameter pulley 68 at point 100 and the other end of the wire is connected at the opposite side of large pulley 66 at point 102. The intermediate portion of this wire is trained around the idler pulley. When the wire is heated through its transition temperature and contracts the result net torque is counterclockwise as viewed in the figure. This rotates pulley pair 64 as well as bistable member 76 which, because it is always under compressive load, becomes unstable at its overcenter position and snaps to the right position shown in phantom at 76'. This opens the circuit through contact 80 while closing the circuit through contact 82.

Pulley pair 64 is rotated in a clockwise direction as viewed in FIG. 3 for resetting bistable member 76 back to the left-hand position. Clockwise rotation is effected by the SMA wire 92 connected at one end to the right-hand side of large diameter pulley 66 at point 94 and connected at its other end to the opposite side of small diameter pulley 68 at point 96. The portion of this wire intermediate its ends is trained around idler pulley 77. When wire 92 is heated through its transition temperature it contracts to produce a net torque in a clockwise direction. The pulley pair is rotated clockwise to flex bistable member 76 which snaps over to the left-hand side. This movement of the bistable member opens the circuit through contact 82 and closes the circuit with contact 80.

The two SMA wires 92 and 98 are heated by means of an electrical power source and control circuit similar to that described for the embodiment of FIG. 1. In this embodiment separate control circuits would interconnect the power source selectively with the two SMA wires so that they can be independently heated on demand to either activate or reset the switch.

Figure 4:
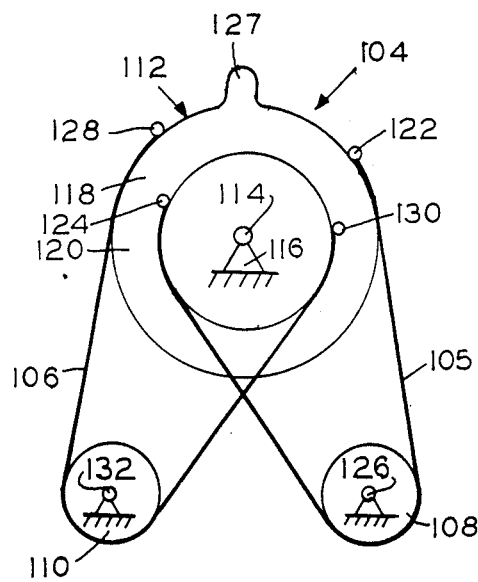
FIG. 4 is a schematic diagram illustrating another embodiment providing a rotary actuator which can be selectively reset to a desired position.

FIG. 4 illustrates an embodiment of the invention providing a rotary actuator 104 having separate sets of SMA wires 105, 106 and idler pulleys 108, 110 for selectively reversible operation. Actuator 104 is comprised of a differential pulley pair 112 mounted for conjoint rotation about axis 114 on reference base 116. The pulley pair includes large pulley 118 and small pulley 120, with the pulley radii preferably differing by substantially 3%. The pulley pair is selectively rotated in a clockwise direction, as viewed in FIG. 4, by means of the first SMA wire 105 having one end connected at point 122 to the outer diameter of the large pulley and its other end connected at point 124 to the opposite end of the small pulley. The portion of the wire intermediate its ends is trained around first idler pulley 108 which is mounted for rotation about axis 126 on the base structure. An arm 127 on the pulley pair actuates the switch or other end use device.

The pulley pair is rotated in a counterclockwise direction by means of the second SMA wire 106 which is mounted at one end at point 128 to the outer diameter of the large pulley and at its other end at point 130 to the opposite side of the small pulley. The portion of wire 106 intermediate its ends is trained about the second idler pulley 110 which is mounted for rotation about axis 132 on the base structure.

An electrical power source and control circuit similar to the embodiment of FIG. 1 is provided for heating the SMA wires through their transition temperatures. The control circuit would be modified to include separate control switches for selectively heating the two SMA wires. In the first phase of the cycle first wire 105 when heated contracts and applies a net torque which urges the pulley pair in a clockwise direction. In the next phase the second wire is heated and contracts to apply a net torque in the opposite sense to urge the pulley pair in a counterclockwise direction. During each phase of the cycle as one wire is heated and contracts the other wire is cooled below the transition temperature and expands back to its trained length.

Figure 5:
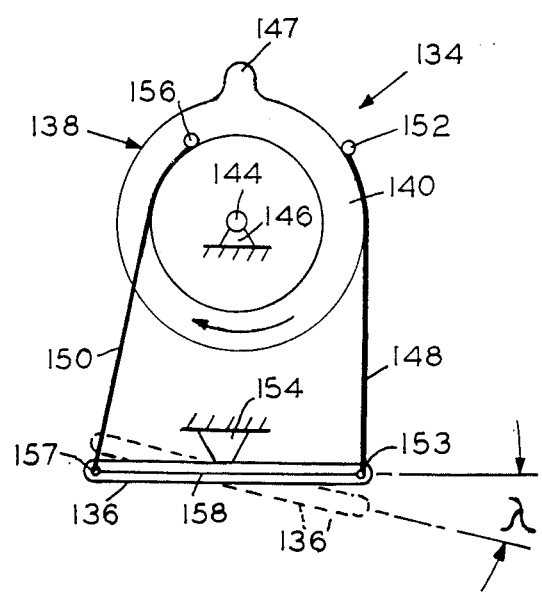
FIG. 5 is a schematic diagram illustrating another embodiment providing a rotary actuator in which the idler elasticity stores and releases energy during each cycle.

The embodiment shown in FIG. 5 provides a rotary actuator 134 in which movement of an idler 136 elastically stores and then releases energy during each cycle of operation. Actuator 13 is comprised of a pulley pair 138 having a large pulley 140 and a small pulley 142 which are mounted for conjoint movement about axis 144 on reference base 146. Preferably the difference in pulley radii is on the order of 3%. An arm 147 extending radially from the pulley pair activates the switch or other end use device.

The pulley pair is actuated to rotate in a clockwise direction, as viewed in the drawing, by means of a pair of SMA wires 148 and 150, each of which can be considered a segment of the elongate element. The first SMA wire 148 is connected at its proximal end to the outer diameter of the large pulley at point 152 and at its distal end to the right-hand side of idler 136 at point 153. The idler comprises an elastically flexible beam which is fixedly mounted at its midpoint to reference base 154. The beam is formed of a material having an elastic memory which stores and releases energy when flexed, such as a metal leaf spring. The second SMA wire 150 is connected at its distal end to the opposite side of small pulley at point 156 and at its proximal end to the left-hand side of the elastic beam at point 157. The lower ends of the wires are electrically connected by a conductor wire 158 leading across the beam. Alternatively, a single SMA wire could be connected at its ends to the large and small pulleys with its intermediate portion connected with and trained along the beam, thereby eliminating the need for a separate conductor wire.

The SMA wires 148 and 150 are cyclically heated by means of an electrical power source and control circuit similar to that shown for the embodiment of FIG. 1. When the wires are heated through their transition temperatures they both contract. This increases the tension in the two wires, and the different radii of the pulleys creates a net torque which causes the pulley pair to turn clockwise. The additional amount of wire put into the loop from the large pulley is $\Delta L = \theta(r_1 - r_2)$ from equation 4 so that beam 136 flexes in a clockwise direction to position 136', which is equivalent to rotation of the idler pulley for the FIG. 1 embodiment. Because the center of the beam is rigidly held on the base, its opposite sides elastically flex through the angle λ. This stores elastic energy in the beam, and the energy is released when the SMA wires are cooled during the next phase of the cycle. As this energy is released the beam flexes back to its initial position, applying a restoring force through wire 150 to rotate the pulley pair counterclockwise back to its initial position, thereby reducing energy losses during each cycle.

Figure 6:
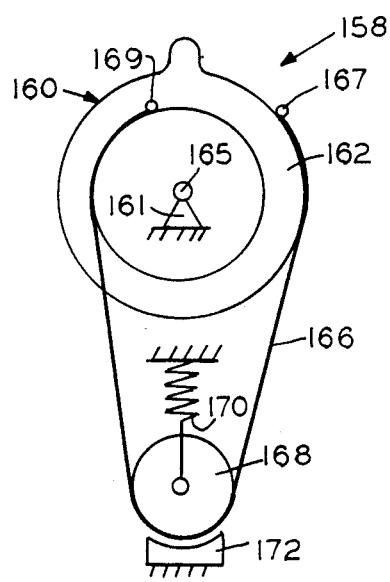
FIG. 6 is a schematic diagram illustrating another embodiment providing a rotary actuator which operates as a stepping motor.

The embodiment shown in FIG. 6 provides a rotary actuator 158 which can operate as a simple stepping motor through the range of its angular displacement. Actuator 158 comprises a differential pulley pair 160 having a large pulley 162 and small pulley 164, with the pulley radii differing by substantially 3%. The pulleys are mounted for conjoint rotation about axis 165 on base 161.

An SMA wire 166 is connected at one end to the outer diameter of large pulley 162 at point 167 and at its other end to the opposite side of small pulley 164 at point 169. The intermediate portion of the wire is trained around an idler pulley 168. The idler pulley is mounted for back-and-forth movement in the direction of the pulley pair, and is resiliently urged away from the pulley pair, by means of a compression spring 170 mounted on the base. When the SMA wire is cooled below its transition temperature and is slack, spring 170 urges the idler pulley away from the pulley pair and into contact with the concave face of a brake shoe 172 which is mounted to the reference base below the idler pulley. This spring loading against the brake shoe causes the idler pulley to lock, which in turn locks pulley pair 160 against rotation.

The SMA wire is heated by means of an electrical energy source and control circuit similar to that described for the FIG. 1 embodiment. When the wire is heated through its transition temperature and contracts, the resultant of the tension forces created on opposite sides of the wire pulls idler pulley 168 upwardly against the force of spring 170 and away from brake shoe 172. This frees the idler pulley for rotation, and the net torque imposed by the SMA wire on the pulley pair causes it to angularly displace clockwise. The circuit from the energy source is opened for the next phase, permitting the wire to cool until it slackens to the point at which the force of spring 170 is sufficient to relock the idler pulley against the brake shoe.

Figure 7:
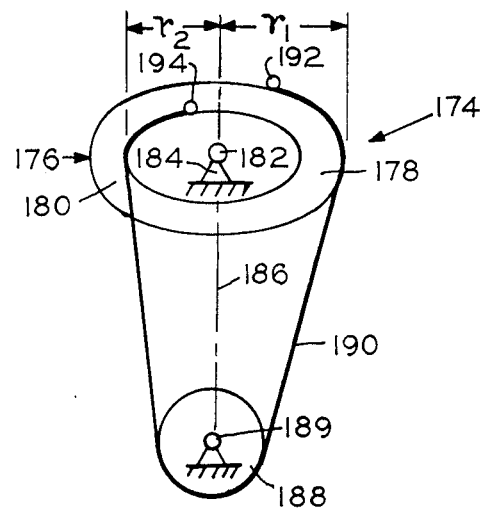
FIG. 7 is a schematic diagram illustrating another embodiment providing a rotary actuator in which the moment arm length of the pulley pair varies with the angle of rotation.

The embodiment of FIG. 7 provides a rotary actuator 174 in which the moment arm lengths of the pulley pair 176 vary as a function of angular displacement. The pulley pair comprises a large pulley 178 and small pulley 180 which are mounted for conjoint rotation about axis 182 on reference base 184. The large and small pulleys are formed as ellipses or other oval shapes having orthogonal long and short axes. In the embodiment which is illustrated the long axes extend generally at right angles to the centerline 186 running through an idler pulley 188 which is mounted on the base for rotation about axis 189. Preferably the radius $r_1$ along the long axis of the large pulley exceeds the radius $r_2$ along the long axis of the small pulley by substantially 3%.

An SMA wire 190 is connected at one end to the outer circumference of the large pulley at point 192 and at its other end to the opposite side of small pulley at point 194. The intermediate portion of the wire is trained around the idler pulley, and the wire is connected to an electrical power source and control circuit similar to that shown for the FIG. 1 embodiment. At the right angle position of the pulley pair shown in FIG. 7 the points of tangency of the wires on the pulleys are equal to the respective radii $r_1$ and $r_2$, which therefore are the effective moment arm lengths at that position.

When SMA wire 190 is heated through its transition temperature and contracts the resulting net torque causes the pulley pair to rotate in a clockwise direction as viewed in the drawing. As rotation progresses from the position shown in FIG. 7, the effective moment arms on opposite sides of the pulley pair decrease because the points of tangency of the wires to the elliptical pulleys are at decreasingly smaller radii. Therefore with this configuration the net torque driving the pulley pair falls off as a function of angular displacement.

In this embodiment the initial position of the elliptical pulleys could be varied from that shown in FIG. 7 according to the desired net torque effect. For example, the long axes of the large and small pulleys could be initially aligned with the idler pulley such that the points of tangency of the SMA wire are close to or at the short axes of the pulleys. With such a configuration the effective moment arms would increase, and the net torque would similarly increase, as a function of angular displacement.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method for producing rotary actuator motion including the steps of supporting first and second moment arms for conjoint rotation about a common axis with the distal ends of the moment arms positioned on opposite sides of the axis, said first moment arm having a radial length $r_1$ and said second moment arm having a radial length $r_2$ which is less than $r_1$ by a predetermined amount, attaching one end of an elongate element of shape memory alloy material to the distal end of the first moment arm and attaching the opposite end of the element to the distal end of the second moment arm, heating the shape memory alloy material through its phase change transition temperature to cause contraction of the length of the element toward its memory shape, and holding the portion of the element intermediate its ends in tension to apply torque forces against the moment arms with the resultant net torque urging the moment arms to rotate about the axis.

2. A method for producing rotary actuator motion including the steps of supporting first and second pulleys for conjoint rotation about a common axis, said pulleys including sectors having arcuate circumferential edges, said sector of the first pulley having a radius of length $r_1$ and said sector of the second pulley having a radius of length $r_2$ which is less than $r_1$ by a predetermined amount, attaching one end of a first elongate element of shape memory alloy material to the circumferential edge of the first pulley and attaching the opposite end of the element to the circumferential edge of the second pulley, heating the shape memory alloy material through its phase change transition temperature to cause contraction of the length of the element toward its memory shape, and holding the portion of the element intermediate its ends in tension to apply differential torque forces of opposite rotational senses against the pulleys with the resultant net torque urging the pulleys to rotate about the axis in a first direction.

3. A method as in claim 2 which includes the step of attaching one end of a second elongate element of shape memory alloy material to the circumferential edge of the first pulley at a position opposite the point of attachment thereto of said first element and attaching the opposite end of the second element to the circumferential edge of the second pulley at a position thereof which is opposite the point of attachment of the opposite end of the first element thereto, heating the shape memory alloy material of the second element through its phase change transition temperature to cause contraction of the length thereof toward its memory shape, and holding the portion of the second element intermediate its ends in tension to apply differential torque forces of opposite rotational senses against the pulleys with the resultant net torque urging the pulleys to rotate about the axis in a direction counter to said first direction of rotation.

4. A method as in claim 2 in which the step of holding the portion of the element intermediate its ends in tension includes the step of constraining said intermediate portion to move along an idler path which is held in a fixed loop spaced a predetermined distance D from said pulley axis.

5. A method as in claim 2 in which the step of holding the portion of the element intermediate its ends in tension is carried out by constraining said intermediate portion to move along an idler path which is held in a loop while applying a yieldable force to urge the intermediate portion in the loop in a direction away from the common axis while enabling the distance between the common axis and loop to vary as a function of the tension in the element.

6. A method as in claim 2 in which the step of holding the portion of the element intermediate its ends in tension is carried out by holding a mid portion of an elastically flexible member at a predetermined distance from said pulley axis, holding one end of the flexible member to the elongate element at a point thereof which leads from the first pulley, holding an opposite side of the flexible member to the elongate element at another point thereof which leads from the second pulley, applying said torque forces to move said opposite ends of the flexible member to deformed positions while storing elastic energy therein, cooling the shape memory alloy material below its phase change transition temperature to cause elongation of the element from its memory shape, releasing the elastic energy stored in the flexible member to move its opposite ends from the deformed positions and applying said released energy as a torque force through the elongate element for rotating the pulleys about said common axis in a direction opposite said first direction of rotation.

7. A method as in claim 2 in which said portion of the element intermediate its ends is held in tension by training said portion around an idler pulley while applying a yieldable force urging the idler pulley in a direction away from said first and second pulleys, holding a brake element at a position in which it engages with and locks the idler pulley when said elongate element is at a length greater than said contraction length, and unlocking said idler pulley from the brake element by causing heating of the shape memory alloy material to undergo contraction and create tension forces in the element at a magnitude greater than and in a direction opposite to the yieldable force being applied against the idler pulley for moving the latter away from the brake element.

8. A method as in claim 2 in which said sectors of the first and second pulleys are formed with oval circumferential edges with each oval edge having orthogonal long and short axes with the effective moment arm of each pulley varying between their long and short axes as a function of angular displacement whereby the torque forces applied by the elongate element during said contraction toward its memory shape applies torque forces against the pulleys which vary as a function of said angular displacement.

9. A rotary actuator comprising means forming first and second moment arms which project in generally opposite directions from a common axis, said first moment arm having a radial length $r_1$ and said second moment arm having a radial length $r_2$ which is less than $r_1$ by a predetermined amount, a reference structure, means mounting said moment arms for conjoint rotation relative to the reference structure about the common axis, an elongate element of shape memory alloy material, means for mounting one end of the element to the outer radial end of the first arm, means for mounting the other end of the element to the outer radial end of the second arm, means for heating the shape memory alloy material of the element through its phase change transition temperature to cause contraction of the length of the element toward its memory shape, and idler means for conducting portions of the shape memory alloy material of the element along a path which extends in a loop from the outer end of the first arm to the outer end of the second arm, said idler means holding the ends of the element under tension forces during contraction of the element with the tension forces applying torques on the respective moment arms whereby the resulting net torque causes relative rotation between the moment arms and reference structure.

10. A rotary actuator comprising the combination of a differential pulley pair, a reference structure, means for mounting the pulley pair for conjoint rotation relative to the reference structure about a common axis, said pulley pair including a first pulley comprised of at least a sector having an arcuate circumferential edge of radius $r_1$, said second pulley composed of at least a sector having an arcuate circumferential edge of radius $r_2$ which is less than $r_1$ by a predetermined amount, an elongate element of shape memory alloy material, means for mounting one end of the element to the arcuate edge of the first pulley, means for mounting the other end of the element to the arcuate edge of the second pulley, means for heating the shape memory alloy material of the element through its phase change transition temperature to cause contraction of the length of the element toward its memory shape, and idler means for conducting portions of the shape memory alloy material of the element along a path which extends in a loop from the outer end of the first arm to the outer end of the second arm, said idler means holding the ends of the element under tension forces during contraction of the element with the tension forces applying torques on the respective first and second pulleys whereby the resulting net torque causes relative rotation between the pulley pair and reference structure in a first direction.

11. A rotary actuator as in claim 10 in which the means for heating the shape memory alloy material includes control means for directing an electric current through the element for resistance heating thereof.

12. A rotary actuator as in claim 10 in which the ratio of pulley radii $$\frac{(r_1 - r_2)}{R}$$

is substantially equal to the ratio of element contraction $$\frac{\Delta L_c}{L}$$

where $$R = \frac{(r_1 + r_2)}{2}$$

and $\Delta L_c$ is the amount of length of said contraction during the phase change transition, and L is the trained length of the element.

13. A rotary actuator as in claim 10 in which the length difference between $r_1$ and $r_2$ is substantially 3%.

14. A rotary actuator as in claim 10 which includes a second elongate element of shape memory alloy material, means for mounting one end of the second element to the second pulley at a portion of its circumferential edge which is on the same side of the pulley pair at which said one end of the first element is mounted to the first pulley, means for mounting the other end of the second element to the first pulley at a portion of the circumferential edge which is on the same side of the pulley pair at which the other end of first element is mounted to the second pulley, means for heating the shape memory alloy material of the second element through its phase change transition temperature to cause contraction of the length thereof towards its memory shape, said idler means including means for conducting portions of the shape memory alloy material of the second element along a path which extends in a loop from the outer edge of the second pulley to the outer edge of the first pulley and for holding the ends of the second element under tension during contraction of the second element with the tension forces applying torques on the respective second and first pulleys whereby the resulting net torque causes relative rotation between the pulley pair and reference structure in a direction opposite to said first direction of rotation.

15. A rotary actuator as in claim 14 in which said idler means includes first and second idler pulleys, means for mounting the first idler pulley about a first axis spaced from the common axis of the pulley pair, means for mounting the second idler pulley for rotation about a second axis spaced from the common axis, said path of the loop of the first element being trained around the first idler pulley and the path of the loop of the second element being trained around the second pulley.

16. A rotary actuator as in claim 10 in which the idler means comprises at least one idler pulley, and means for mounting the idler pulley for rotation about an axis parallel with the common axis of the pulley pair with the path of the loop of the elongate element trained around the idler pulley.

17. A rotary actuator as in claim 16 in which said means for mounting the idler pulley maintains the axis of rotation of the idler pulley at a fixed distance from the common axis of the pulley pair.

18. A rotary actuator as in claim 16 in which the means for mounting the idler pulley includes means applying a yieldable force urging the idler pulley in a direction away from the pulley pair to maintain tension force in the elongate element with the distance between the axes of rotation of the pulley pair and idler pulley varying as a function of tension force in the element.

19. A rotary actuator as in claim 18 in which said means for mounting the idler pulley includes an elastically flexible member mounted at one end about the common axis of the pulley pair and at its other end about the axis of the idler pulley, said flexible member being held under compression loading and bowed into an arcuate shape by the tension forces in the element, and means for rotating one end of the flexible member conjointly with rotation of the pulley pair with the midspan of the flexible element displacing across opposite sides of an overcenter position when the pulley pair undergoes a predetermined angular displacement.

20. A rotary actuator as in claim 19 providing bistable switch operation which includes switch means comprising circuit means having contacts which are open and closed responsive to said displacement of the flexible member to respective opposite sides.

21. A rotary actuator as in claim 10 in which the elongate elements includes a first segment connected at its proximal end to the first pulley and a second segment connected at its proximal end to the second pulley, said idler means comprises an elastically flexible member, means for fixedly mounting a mid portion of the flexible member at a predetermined distance from the common axis of the pulley pair, means for connecting one end of the flexible member to the distal end of the first segment, means for connecting the opposite end of the flexible member to the distal end of the second segment, said tension forces in the elongate element during contraction thereof pulling the ends of the flexible member to deformed positions while storing elastic energy therein, and means for cooling the shape memory alloy material to below its phase change transition temperature to cause elongation of the element from its memory shape with the elastic energy stored in the flexible member being released to move its opposite ends from the deformed position and thereby apply torque forces through the segments of the element for rotating the pulley pair in a direction opposite said first direction of rotation.

22. A rotary actuator as in claim 10 in which said first pulley is formed with an oval circumferential edge having orthogonal long axis and short axis, said second pulley is formed with an oval circumferential edge having orthogonal long and short axes, the effective moment arms of the first and second pulleys varying between their long and short axes as a function of angular displacement of the pulley pair whereby the torque forces applied by the elongate element during said contraction toward its memory shape applies torque forces against the pulleys which vary as a function of said angular displacement.

23. A rotary actuator comprising the combination of a first pulley, a second pulley, a reference base, means for mounting the first and second pulleys conjointly together for rotation relative to the base, an elongate element of shape memory alloy material which undergoes a change in length between a memory shape and a trained shape when thermally cycled through the phase change transition temperature of the material, means for mounting one end of the element on the first pulley at a first radius $r_1$ and the other end of the element to the second pulley at a second radius $r_2$ on a side thereof which is opposite the side at which said first end is mounted, said first radius $r_1$ exceeding the second radius $r_2$ by a predetermined differential distance, idler means for conducting portions of the shape memory alloy along a path between the first and second pulleys during said change in length, said idler means constraining the path at a predetermined distance from the first and second pulleys whereby contraction in length of the element causes the opposite ends of the element to apply tension forces to the pulleys at the respective radii $r_1$ and $r_2$ whereby a resultant differential torque is applied to the pulleys for urging the pulleys and base to undergo relative rotation.

* * * * *